United States Patent
Alon et al.

(10) Patent No.: US 7,756,103 B2
(45) Date of Patent: Jul. 13, 2010

(54) DEVICE, SYSTEM AND METHOD OF ADJUSTMENT OF A DELIVERY MECHANISM ACCORDING TO ACCESS CATEGORIES

(75) Inventors: Ayelet Alon, Haifa (IL); Oren Kaidar, Binyamina (IL); Sharon Gingold, Haifa (IL)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 11/394,216

(22) Filed: Mar. 31, 2006

(65) Prior Publication Data

US 2007/0237104 A1 Oct. 11, 2007

(51) Int. Cl.
*H04J 3/24* (2006.01)
(52) U.S. Cl. .............. 370/349; 370/311; 370/318; 370/395.21; 370/412; 455/69; 455/13.4; 455/522; 455/574
(58) Field of Classification Search .............. 370/318, 370/349, 395.21, 412, 311; 455/13.4, 69, 455/522
See application file for complete search history.

(56) References Cited

U.S. PATENT DOCUMENTS

| | | | |
|---|---|---|---|
| 7,668,129 B2* | 2/2010 | Alon et al. .......... | 370/311 |
| 2005/0136833 A1* | 6/2005 | Emeott et al. .......... | 455/11.1 |
| 2005/0152324 A1* | 7/2005 | Benveniste .......... | 370/338 |
| 2005/0213534 A1* | 9/2005 | Benveniste .......... | 370/328 |
| 2005/0237984 A1* | 10/2005 | Benveniste .......... | 370/338 |
| 2006/0039395 A1* | 2/2006 | Perez-Costa et al. ........ | 370/412 |
| 2006/0062181 A1* | 3/2006 | Chou .......... | 370/329 |
| 2006/0229023 A1 | 10/2006 | Alon et al. | |
| 2007/0147330 A1* | 6/2007 | Smith et al. .......... | 370/346 |
| 2007/0238439 A1* | 10/2007 | Alon et al. .......... | 455/343.2 |
| 2008/0151835 A1* | 6/2008 | Kneckt et al. .......... | 370/331 |

OTHER PUBLICATIONS

Shepard A, "Hybrid Change Makes WLAN QoS Come to Life", CommsDesign http://www.CommsDesign.com/showarticle.jhtml?articleID=19200133. pp. 1-5, published Apr. 28, 2004.
Banginwar R, Gorbatov E, "Gibraltar: Application and Network Aware Adaptive Power Management for IEEE 802.11" Corporate Technology Group, Intel Corporation, 2004, pp. 1-10.

(Continued)

*Primary Examiner*—Rafael Pérez-Gutiérrez
*Assistant Examiner*—Liton Miah
(74) *Attorney, Agent, or Firm*—Shiloh et al.

(57) ABSTRACT

Embodiments of the invention provide devices, systems and methods of selecting one or more power save parameters of a wireless device according to an expected traffic pattern. For example, a method according to embodiments of the invention includes selecting either an automatic power save delivery mechanism or a legacy power save delivery mechanism for transmitting a frame based on an access category of the frame to be transmitted. A method according to embodiments of the invention may include switching the delivery mechanism from an automatic power save delivery mechanism to a legacy power save delivery mechanism for access categories that are both trigger- and delivery-enabled if the access category indicates that burst-type traffic is expected. Other features are described and claimed.

25 Claims, 2 Drawing Sheets

OTHER PUBLICATIONS

IEEE 802.11e Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications: Amendment 8: Medium Access Control (MAC) Quality of Service Enhancements.

IEEE 802.11e/D13.0, Jan. 2005 (Draft Amendment to IEEE Std. 802.11, 1999).

IEEE-Std 802.11, 1999 Ed. (ISO/IEC 8802-11:1999).

Wenjian Shao, Dongxu Shen, Daiqin Yang, Li V.O.K. "A power-controlled MAC supporting service differentiation in mobile ad hoc networks", Dept. of Electr. & Electron. Eng., Hong Kong Univ., China, Publication Date: Sep. 11-14, 2005, vol. 4, On pp. 2742-2746 vol. 4.

Tzu-Chieh Tsai; Ming-Ju Wu "An analytical model for IEEE 802.11e EDCA" Communications, 2005. ICC 2005. 2005 IEEE International Conference on, vol. 5, Issue , May 16-20, 2005 pp. 3474-3478 vol. 5.

International Search Report and Written Opinion of Application No. PCT/US2007/064732, dated Aug. 28, 2007.

* cited by examiner

US 7,756,103 B2

DEVICE, SYSTEM AND METHOD OF ADJUSTMENT OF A DELIVERY MECHANISM ACCORDING TO ACCESS CATEGORIES

BACKGROUND OF THE INVENTION

The Institute of Electrical and Electronics Engineers (IEEE) 802.11e specification, approved in September of 2005, defines a set of Quality of Service (QoS) enhancements for local area network (LAN), and in particular wireless LAN (WLAN), applications. For example, a QoS capability in a network may assign access categories (ACs) to various streams of packets. The assigned AC of a stream of packets may depend on the packets' priority, for example, as assigned by an application, and may be referred to as a user priority (UP). An AC may include, for example, a common set of enhanced distributed channel access (EDCA) parameters that may be used by a QoS function to contend for a channel in order to transmit packets with certain priorities. For example, the Wi-Fi Multimedia (WMM certification, which is based on the IEEE 802.11e standard, prioritizes traffic according to four access categories (ACs): voice (AC_VO), video (AC_VI), best effort (AC_BE), and background (AC_BE). Additional information regarding the IEEE 802.11e standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements" (published 2005).

Different ACs may be associated with different power saving parameters. One such power saving parameter may be, for example, the delivery mechanism used by an access point (AP) to deliver packets to a station (STA) that is operating in a reduced power mode. For example, one delivery mechanism may be the "legacy" power save mechanism of the IEEE 802.11 standard: "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Another delivery mechanism may be the automatic power save delivery (APSD) mechanism, e.g., unscheduled APSD (UAPSD) or scheduled APSD (S-APSD), as defined in 802.11e. A QoS station (QSTA) may define all or some of the ACs as trigger-enabled and/or delivery-enabled. A trigger- and delivery-enabled AC may use UAPSD as the default delivery mechanism, whereas an AC that is neither trigger- nor delivery-enabled may use the "legacy" power save delivery mechanism.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE INVENTION

Figure 1:
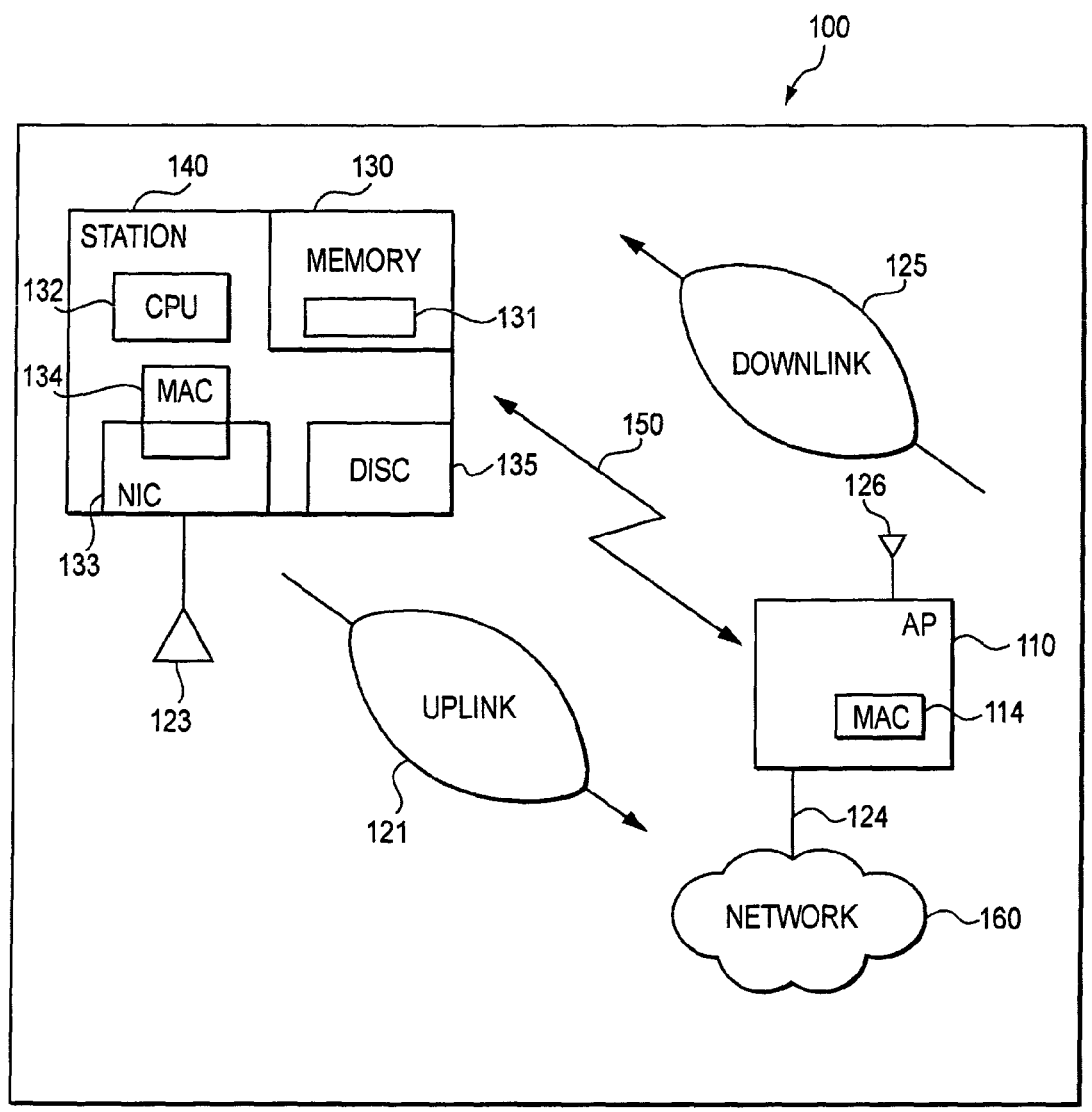
FIG. 1 is a schematic diagram of a communication system including at least one wireless device having quality-of-service capabilities in accordance with some demonstrative embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing," "analyzing," "checking," or the like, may refer to operations and/or processes of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

Although embodiments of the invention are not limited in this regard, the term "reduced power mode" as used herein may include, for example, an idle mode, a standby mode, a power conservation mode, a power save mode, an efficiency mode, a "sleep" mode, a semi-operational mode, a semi-active mode, a partially-active mode, or other modes of operations in which a component (e.g., a transceiver or a sub-unit thereof) is not fully operational and/or active.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless access point (AP), a modem, a wireless modem, a personal computer, a desktop computer, a mobile computer, a laptop computer, a notebook computer, a personal digital assistant (PDA) device, a tablet computer, a server computer, a network, a wireless network, a local area network (LAN), a wireless LAN (WLAN), devices and/or networks operating in accordance with existing IEEE 802.11, 802.11a, 802.11b, 802.11e, 802.11g, 802.11h, 802.11i, 802.11n, 802.16 standards and/or future versions of the above standards, a personal area network (PAN), a wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, a multi receiver chain (MRC) transceiver or device, a transceiver or device having "smart antenna" technology or multiple antenna technology, or the like. Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), or the like. Embodiments of the invention may be used in various other apparatuses, devices, systems and/or networks.

Reference is made to FIG. 1, which schematically illustrates a communication system 100 in accordance with some demonstrative embodiments of the invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

In some embodiments, communication system 100 may include or may be a local area network (LAN) with quality of service (QoS) capabilities, e.g., a wireless local area network (WLAN) in accordance with the 802.11e standards as are known in the art. For example, system 100 may include one or more wireless mobile units such as, for example, station (STA) 140 and one or more providers of a basic service set (BSS) such as, for example, access point (AP) 110. AP 110 and STA 140 may include media access controllers (MACs) 114 and 134, respectively, to provide QoS functionality, e.g., in accordance with 802.11e, or any other suitable standards or specifications that are known in the art. In particular, MAC 114 of AP 110 and/or MAC 134 of STA 140 may be able to select a power save delivery mechanism for transmitting a frame based on an access category of the frame to be transmitted and the type of traffic expected, as explained in detail below. MACs 114 and 134 may be implemented using any suitable combination of hardware and/or software as is known in the art.

In some embodiments, communication system 100 may be, for example, a wireless network or a network that may include wireless components. AP 110 and STA 140 may communicate network traffic 150 over a shared access medium, e.g., using one or more wireless links such as a downlink 125 and an uplink 121, as are known in the art. Although embodiments of the invention are not limited in this respect, traffic 150 may include packets or other collections of signals and/or data, such as, e.g., media access control service data units (MSDUs) that may make up a transmission of wireless signals. Uplink 121 may include a stream of wireless signals or packets of traffic 150 that are sent from STA 140 to AP 110. Downlink 125 may include streams of wireless signals or packets of traffic 150 that are received by STA 140 from AP 110.

Although embodiments of the invention are not limited in this respect, AP 110 and STA 140 may be operatively coupled with radio frequency antennas 126 and 123, respectively, which may include or may be an internal and/or external RF antenna, for example, a dipole antenna, a monopole antenna, an omni-directional antenna, an end-fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, AP 110 may be a dedicated device with additional functionality such as, for example, providing a bridge to wired network infrastructure or arbitrating communication of stations in the WLAN. For example, AP 110 may facilitate communication with a wider network 160 such as, for example, the Internet or an intranet, by either wireless communication or wires 124. A BSS provider such as AP 110 may in some embodiments associate wireless devices such as STA 140 with other equipment such as, for example, personal computers, workstations, printers, and the like. In some embodiments, two or more wireless mobile units such as STA 140 may communicate with each other, e.g., forming an independent basic service set (IBSS) or ad-hoc network.

In some embodiments, STA 140 may include a wireless interface device such as a network interface card (NIC) 133. For example, NIC 133 may provide functionality related to the data link layer of the seven-layer Open Systems Interconnection (OSI) reference model of network communications. Although embodiments of the invention are not limited in this respect, MAC 134 may be included within NIC 133, or the MAC may be a separate component or components in STA 140. For example, MAC 134 may function as a device driver, as known in the art, for NIC 133. In some embodiments, MAC 134 may include an upper MAC layer and a lower MAC layer, as are known in the art. The lower MAC layer may, for example, be included within NIC 133.

In some embodiments, STA 140 may include, for example, a processor 132, a memory unit 130, and a storage unit 135. Although embodiments of the invention are not limited in this respect, processor 132 may include, for example, a central processing unit (CPU), a digital signal processor (DSP), a microprocessor, a controller, a chip, a microchip, an integrated circuit (IC), or any other suitable multi-purpose or specific processor or controller. Memory unit 130 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 135 may include, for example, a hard disk drive, a floppy disk drive, a compact disk (CD) drive, a CD-ROM drive, or other suitable removable or non-removable storage units. In some embodiments, instructions may be recorded or stored, for example, in storage medium 135, which may, when executed, approximate a method in accordance with an embodiment of the invention.

Although embodiments of the invention are not limited in this respect, memory unit 130 and/or storage unit 135 may store, e.g., data relating to wireless communication standards such as for example IEEE-Std 802.11, 1999 Ed. (ISO/IEC 8802-11:1999) and more particularly the IEEE 802.11e/D13.0, January 2005 (Draft Amendment to IEEE Std. 802.11, 1999) and/or the Wi-Fi Multimedia (WMM) certification. Memory 130 may also store data relating to, for example, QoS capabilities applicable to WLAN 100 and to one or more ACs used in delivering traffic 150, including, for example QoS and/or power saving parameters 131 that may be applicable to such respective ACs. For example, parameters 131 may include data relating to the four access categories of WMM: voice (AC_VO), video (AC_VI), best effort (AC_BE), and background (AC_BE), although other ACs may be used.

Although embodiments of the invention are not limited in this respect, processor 132, alone or in conjunction with one or more other processors, may be suitable for determining the AC of a transmitted or received signal in uplink 121 or downlink 125. In some embodiments, processor 132 may be suitable for selecting a power saving parameter 131 that is applicable to the AC of a particular packet or wireless signal in a stream of traffic 150. For example, processor 132 may select the delivery mechanism to be used for delivering downlink packets of traffic 150 in each AC. In some embodiments, power saving parameters 131 associated with a particular AC in a link or stream of traffic 150 may be available from other sources. For example, in some embodiments, the delivery mechanism may be selected by MAC 134 according to settings provided from an upper layer in the OSI reference model, e.g., a network application.

In accordance with 802.11e and WMM, a QoS station (QSTA) such as, for example, STA 140, may designate all or some of its ACs as delivery-enabled, trigger-enabled, or trigger- and delivery-enabled. Some ACs may be defined as non-trigger-/non-delivery-enabled. For example, STA 140 may set its association request frames, as is known in the art, to indicate that the corresponding AC is both trigger-enabled and delivery-enabled upon association with a QoS-enabled BSS provider such as, for example, AP 110. Additionally or alternatively, STA 140 may use a traffic specification (TSPEC), as is known in the art, to define a particular AC as exclusively either triggerenabled or delivery-enabled, or as both trigger-enabled and delivery-enabled.

It will be appreciated by those of skill in the art that defining an AC as delivery-enabled and/or trigger-enabled may associate a default power save delivery mechanism for downlink traffic, e.g., traffic 150 from AP 110 to STA 140, with the corresponding AC. For example, an AC that is both trigger-enabled and delivery-enabled may be associated with unscheduled automatic power save delivery (UAPSD) as a default delivery mechanism, whereas another AC may utilize a legacy power save delivery mechanism in accordance with the 802.11 standards, e.g., using PS-Poll frames or any other method for delivery of downlink traffic.

In accordance with demonstrative embodiments of the invention, downlink and/or uplink traffic of a trigger- and delivery-enabled AC may be handled according to its characterizations, for example, based on an expected traffic pattern. Thus, embodiments of the invention may allow the QSTA, e.g., STA 140, to optimize a balance between power consumption and performance. For example, some demonstrative embodiments of the invention may include selection of one or more power save parameters, e.g., a delivery mechanism, based on the corresponding AC of the frame to be transmitted, rather than the default delivery mechanism defined during association or TSPEC, which commonly sets all ACs as both trigger- and delivery-enabled, defining the UAPSD mechanism.

For example, in accordance with some demonstrative embodiments of the invention, all ACs may be defined as both trigger- and delivery-enabled during the association process. However, ACs that indicate periodic traffic is expected, e.g., AC_VO and AC_VI, may use an automatic power save delivery mechanism; whereas ACs that indicate that burst-type traffic is expected, e.g., AC_BK and AC_BE, may use a legacy power save delivery mechanism such as, for example, PS-Poll frames.

Although embodiments of the invention are not limited in this respect, it may be desirable for a QSTA such as, e.g., STA 140 to define all access categories as both trigger- and delivery-enabled, regardless of the default delivery mechanism. It will be appreciated that with such settings, the beacon frame may include a traffic indication map (TIM) for informing STA 140 whether there are any data frames queued and waiting for delivery to STA 140. This indication may be used by STA 140 to initiate the delivery of buffered frames, for example by initiating a trigger frame or PS-Poll frame, or by any other suitable method as known in the art.

Although embodiments of the invention are not limited in this respect, it may be desirable for a QSTA such as, e.g., STA 140 to remain in an active mode when more traffic bursts are expected. In addition, it may be desirable to enter a reduced power mode, e.g., power save (PS), when traffic is expected only periodically. In accordance with some demonstrative embodiments of the invention, the power save behavior of STA 140 may be described by the following pseudo-code:

Extract current AC from QoS parameters for each downlink or uplink frame.
If STA is in Active mode:
If AC_BE or AC_BK then remain in Active mode. Reset timeout to last data transaction. STA may return to PS mode when timeout expires.
Else If AC_VO or AC_VI then STA may move to PS mode as soon as pending timeout expires.
If STA is in PS mode:
If AC_BE or AC_BK then move STA into Active mode. Reset timeout to last data transaction. STA may return to PS mode when timeout expires.
Else If AC_VO or AC_VI then remain in PS mode. Use UAPSD as the delivery mechanism for downlink traffic.

Figure 2:
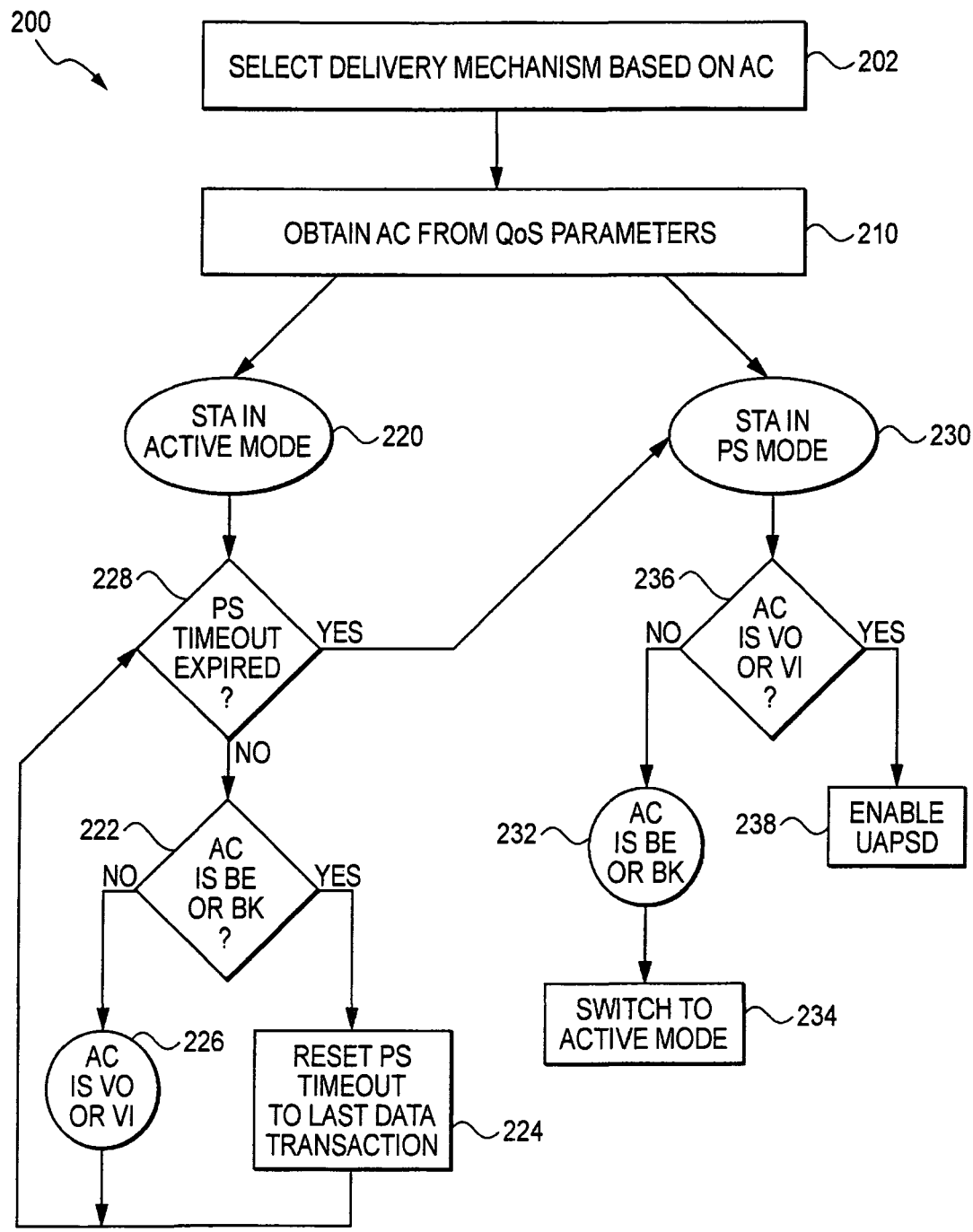
FIG. 2 is a schematic flowchart of a method of power save behavior in accordance with some demonstrative embodiments of the invention; and It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Reference is made to FIG. 2, which schematically illustrates a flowchart of a method 200 of power save behavior in accordance with some demonstrative embodiments of the invention. Although embodiments of the invention are not limited in this respect, method 200 may be performed, for example, by a QoS station such as STA 140 of FIG. 1.

As indicated at box 202, method 200 may include selecting a delivery mechanism, e.g., an automatic power save delivery mechanism such as UAPSD or a legacy power save delivery mechanism such as PS-Poll frames, for transmitting a frame based on an expected traffic pattern. In accordance with demonstrative embodiments of the invention, the expected traffic pattern may be indicated by the AC of the transmitted and/or received frame. Although embodiments of the invention are not limited in this respect, a simple algorithm may associate the expected traffic pattern with the access category. For example, a burst-type traffic pattern may be associated with the background and/or best effort access categories and a periodic traffic pattern may be associated with the voice and/or video access categories. Additionally or alternatively, the access category and respective delivery mechanism association may be predefined. For example, in one embodiment, the delivery mechanism may be selected according to a lookup table stored in power save parameters 131.

As indicated at block 210, method 200 may include extracting an AC from one or more QoS parameters of a received frame. For example, in some embodiments the AC may be obtained from the user priority (UP) field of the MAC header of the received frame, as known in the art. In other embodiments, the AC may be obtained according to which queue the frame is allocated by the station's MAC. It will be appreciated by those of skill in the art that in accordance with 802.11e, the MAC may manage separate transmission queues of frames for the different ACs.

As indicated at blocks 220 and 230, the receiving station may be either in active mode or in power save mode, respectively. It will be appreciated that before entering a reduced power mode, the receiving station, e.g., STA 140 of FIG. 1, may notify the BSS provider, e.g., AP 110 of FIG. 1, so that the AP may buffer the frames of traffic intended for that station. For example, in accordance with the legacy power save delivery mechanism of the 802.11 standards, delivery of the buffered traffic may be triggered by receiving a PS-Poll frame from the station or when the station switches to active mode. As indicated at block 228, when the station is in active mode, it may implement a power save timeout, as known in the art, and may remain in active mode until the timeout expires.

As indicated at blocks 222 and 236, method 200 may include determining an expected traffic pattern based on the AC of the frame. For example, in accordance with demonstrative embodiments of the invention, the best-effort and background ACs may indicate that additional traffic bursts are expected, whereas the voice and video ACs may indicate that additional traffic is expected periodically.

Thus, as indicated at block 222, if the received frame's access category is AC_BE or AC_BK, method 200 may include ensuring the station is in active mode to receive the subsequent bursts of traffic. For example, as indicated at block 224, if the station is in active mode, method 200 may include resetting the power save timeout from the last data transaction so that the station remains in active mode for an additional period of time. As indicated at block 226, if the AC is not AC_BE or AC_BK, method 200 may not include extending the power save timeout, and the station may switch to a reduced power mode when the current timeout expires.

As indicated at block 236, if the received frame's access category is AC_VO or AC_VI, method 200 may include using a reduced power mode while no traffic bursts are expected. For example, as indicated at block 238, if the station is in power save mode, method 200 may include enabling the automatic power save delivery mechanism, e.g., UAPSD, for downlink traffic. As indicated at block 232, if the AC is not AC_VO or AC_VI, method 200 may not include enabling the automatic power save delivery mechanism, and the STA may use the legacy power save delivery mechanism instead. As indicated at block 234, if the AC is AC_BE or AC_BK, method 200 may include switching to active mode to receive subsequent traffic bursts, as described with reference to block 222.

It will be appreciated by those of skill in the art that the UAPSD mechanism may be particularly suited for delivery of periodic traffic. For example, UAPSD may allow the station to control when it enters an awake state for receiving buffered frames without significant latency, e.g., by sending a trigger frame, as known in the art. In addition, the station may return to a reduced power mode, e.g., a doze state, following the end of service period, as known in the art, and may thus conserve power while additional traffic bursts are not expected.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   associating a first power save delivery mechanism with a plurality of access categories; and
   based on an access category extracted from a frame received by a first wireless communication device over a wireless communication link, selecting either said first power save delivery mechanism or a second, different, power save delivery mechanism for delivery of one or more additional frames from a second wireless communication device to the first wireless communication device over the wireless communication link.

2. The method of claim 1 comprising:
   determining an expected traffic pattern of the one or more additional frames based on the extracted access category,
   wherein the selecting based on the access category comprises selecting based on the expected traffic pattern.

3. The method of claim 1, wherein the first and second power save delivery mechanisms comprise an automatic power save delivery mechanism and a legacy power save delivery mechanism, respectively.

4. The method of claim 1, wherein selecting said power save delivery mechanism comprises selecting an unscheduled automatic power save delivery mechanism, if said first wireless communication device is in a power-save mode and the extracted access category is associated with a periodic traffic pattern.

5. The method of claim 4, wherein said access category is either video or voice.

6. The method of claim 1 comprising:
   switching said first communication device from a power-save mode to an active mode, if said extracted access category is associated with a burst-type traffic pattern.

7. The method of claim 6, wherein said access category is either background or best effort.

8. The method of claim 1 comprising:
   transmitting one or more association request frames from the first wireless communication device to the second wireless communication device,
   wherein the association request frames indicate the selected power-save delivery mechanism.

9. The method of claim 1 comprising:
   determining an expected traffic pattern of the one or more additional frames based on the extracted access category; and
   if said first wireless communication device is in an active mode and the expected traffic pattern includes a burst-type traffic pattern, resetting a power-save timeout at the first wireless communication device.

10. The method of claim 1 comprising:
    determining an expected traffic pattern of the one or more additional frames based on the extracted access category;
    if said first wireless communication device is in a power-save mode and the expected traffic pattern includes a periodic traffic pattern, selecting an unscheduled automatic power save delivery mechanism;
    if said first wireless communication device is in the power-save mode and the expected traffic pattern includes a burst-type traffic pattern, switching said first communication device from the power-save mode to an active mode; and if said first wireless communication device is in the active mode and the expected traffic pattern comprises the burst-type traffic pattern, resetting a power-save timeout at the first wireless communication device.

11. An apparatus comprising:
a processor to select, based on an access category extracted from a frame received by a first wireless communication device over a wireless communication link, either a first power save delivery mechanism or a second, different, power save delivery mechanism for delivery of one or more additional frames from a second wireless communication device to the first wireless communication device over the wireless communication link.

12. The apparatus of claim 11, wherein the processor is to determine an expected traffic pattern of the one or more additional frames based on the extracted access category, and to select said first or second power save delivery mechanism based on the expected traffic pattern.

13. The apparatus of claim 11, wherein the first and second power save delivery mechanisms comprise an automatic power save delivery mechanism and a legacy power save delivery mechanism, respectively.

14. The apparatus of claim 11, wherein the processor is to select an unscheduled automatic power save delivery mechanism, if said first wireless communication device is in a power-save mode and the extracted access category is associated with a periodic traffic pattern.

15. The apparatus of claim 14, wherein said access category is either video or voice.

16. The apparatus of claim 11, wherein the processor is to cause the first communication device to switch from a power-save mode to an active mode, if said extracted access category is associated with a burst-type traffic pattern.

17. The apparatus of claim 16, wherein said access category is either background or best effort.

18. The apparatus of claim 11, wherein the processor is to cause the first wireless communication device to transmit one or more association request frames to the second wireless communication device, wherein the association request frames indicate the selected power-save delivery mechanism.

19. The apparatus of claim 11, wherein the processor is to reset a power-save timeout at the first wireless communication device, if the extracted access category is associated with a burst-type traffic pattern.

20. The apparatus of claim 11, wherein the processor is able to determine an expected traffic pattern of the one or more additional frames based on the extracted access category; to select an unscheduled automatic power save delivery mechanism, if said first wireless communication device is in a power-save mode and the expected traffic pattern includes a periodic traffic pattern; to cause the first wireless communication device to switch from the power-save mode to an active mode, if said first wireless communication device is in the power-save mode and the expected traffic pattern includes a burst-type traffic pattern; and to reset a power-save timeout at the first wireless communication device, if said first wireless communication device is in the active mode and the expected traffic pattern comprises the burst-type traffic pattern.

21. A system comprising:
at least one wireless communication device to select, based on an access category extracted from a frame received by the wireless communication device over a wireless communication link, either a first power save delivery mechanism or a second, different, power save delivery mechanism for delivery of one or more additional frames to the wireless communication device over the wireless communication link; and
an antenna operably associated with the wireless communication device, to receive said frames.

22. The system of claim 21 comprising an additional wireless communication device to transmit said frames.

23. The system of claim 21, wherein the wireless communication device is to determine an expected traffic pattern of the one or more additional frames based on the extracted access category, and to select said first or second power save delivery mechanism based on the expected traffic pattern.

24. The system of claim 21, wherein the first and second power save delivery mechanisms comprise an automatic power save delivery mechanism and a legacy power save delivery mechanism, respectively.

25. The system of claim 24, wherein the wireless communication device is able to determine an expected traffic pattern of the one or more additional frames based on the extracted access category; to select an unscheduled automatic power save delivery mechanism, if the wireless communication device is in a power-save mode and the expected traffic pattern includes a periodic traffic pattern; to switch from the power-save mode to an active mode, if said wireless communication device is in the power-save mode and the expected traffic pattern includes a burst-type traffic pattern; and to reset a power-save timeout, if said wireless communication device is in the active mode and the expected traffic pattern comprises the burst-type traffic pattern.

* * * * *